July 13, 1954

W. RICKENBACK 2,683,470

SHUTTLE SPUR

Filed June 3, 1950

INVENTOR.
WILLIAM RICKENBACK
BY
Rodney C. Southworth
ATTORNEY

July 13, 1954     W. RICKENBACK     2,683,470
SHUTTLE SPUR

Filed June 3, 1950     2 Sheets-Sheet 2

INVENTOR.
WILLIAM RICKENBACK
BY
Rodney C. Southworth
ATTORNEY

Patented July 13, 1954

2,683,470

UNITED STATES PATENT OFFICE 2,683,470

SHUTTLE SPUR

William Rickenback, Hopedale, Mass., assignor to Draper Corporation, Hopedale, Mass., a corporation of Maine Application June 3, 1950, Serial No. 166,021

7 Claims. (Cl. 139—196)

This invention pertains to shuttles for looms, and more specifically, to improvements in shuttle spurs and means for retaining those spurs more firmly fixed in the shuttle of which they form a part.

It is a general object of the invention to devise a shuttle spur and to so modify the combination of a shuttle spur and its retaining ferrule that when inserted in the wood or other material of the shuttle body of which they form a part they are effectively held therein and do not tend to become loosened thereby to contribute to failure of the shuttle.

It is a more specific object of the invention to provide means integral with the shuttle spur for preventing rotation of the shuttle spur in the body of the shuttle thereby to eliminate one cause for which the spurs become loosened and thereafter displaced longitudinally within the shuttle.

A further object is that of so modifying the shuttle spur and interconnecting it through to the ferrule as to convey lateral stresses imparted to the spur to the ferrule and thereby to absorb those stresses through both the spur shank and ferrule to prevent loosening of the spurs in the material of the shuttle body.

Shuttles for looms, as at present constructed, are largely made from wood and the tapered ends of the shuttles are provided with hardened metallic points or spurs which comprise a conoidal, pointed end or protective contact member held by an elongated shank driven under considerable pressure into the wood or other material of the shuttle during the manufacture thereof. The frictional retaining forces set up upon driving the spurs into the wood are supplemented by an adhesive for obtaining additional holding power, and frequently, the spurs are accompanied by a ferrule in the form of a ring which is also driven into an annular indentation formed in the shuttle body concentrically with the hole into which the shank of the shuttle spur is driven. Shuttles are subjected to very pronounced and repeated shock forces as they are picked to and fro across the loom and, as a result, the shuttle spurs in a few instances do become loosened and, of course, once that has occurred, picking of the shuttle and its smooth passage to and fro through a warp shed is seriously affected. In many instances the life of the shuttle is terminated thereby. It is thus very desirable that some means be found to retain these spurs in the shuttle material in a positive manner thereby to obviate or at least to reduce to an absolute minimum, the above mentioned difficulty.

According to observations made over a period of study, one reason that the shuttle spurs become loosened appears to be that incidental to a tendency they have to turn or to rotate with respect to the remainder of the shuttle. The action of the pickers is conveyed to the shuttle through the spurs and while it is theoretically contemplated that the picker shall engage a spur concentrically and propel the shuttle by axial forces only, that ideal condition is not realized in actual practice and appreciable lateral forces and more complex forces are imparted to the spur as it engages the picker and as the picker in turn conveys its propelling force through the spur to the shuttle. Certain components of these forces produce the rotating tendencies above mentioned. It is believed that this does eventually break the bond or holding power between the shuttle spur shank and the material of the shuttle into which it is inserted and then, of course, the spur slowly works outwardly or longitudinally of the shuttle loosening to a point where operation becomes impractical.

According to the invention, the shanks of the shuttle spurs are so formed that they are retained in the shuttle wood or other material very tightly being driven in under considerable pressure, and also are so constructed that upon insertion, they distort or reform or mold the wood of the shuttle which is simultaneously actually compressed to a considerable extent so that the wood enters certain indentations or grooves or the like in the shank thereby providing a key of wood engaged within a complementary groove or keyway in the shank. The number of indentations or grooves in the shank may be varied and this action is preferably supplemented by a cooperating retaining influence, e. g., inwardly directed radial forces confining or restraining the compressed shuttle material, this latter function being accomplished by the insertion of a metal ferrule concentrically disposed to and surrounding the column of wood which is compressed as above stated.

In the accomplishment of this, the entire shank is formed of substantially cylindrical cross section, that greatly facilitating production since the parts may be made on automatic screw machines or other high production turning equipment and their dimensions held within relatively close limits, that not being possible if the parts are forged as is necessary according to certain other practices. Preferably that part of the shank adjacent the spur tip and which is more or less coextensive in length with the ferrule is slightly enlarged and connected by a tapering section to the remaining more extreme end of the shank which is driven into the opening in the shuttle material first. Grooves are formed in the enlarged shank section, these being preferably of a depth more or less equal to the difference in radii between the larger and smaller diameters of the shank. However, some variation is contemplated and the exact dimensions may vary within limits so long as the compression of the wood between the ferrule and the shank is not such as to destroy the cell continuity of the wood and so long as the action is one of molding that wood as it is compressed into the form desired rather than cutting or shearing parts therefrom and thereby weakening the material so that the actual result may be to lessen the holding force rather than to increase it.

To supplement the rotation preventing features, a shoulder integrally formed between the inner face of the spur tip and the enlarged section of the shank is adapted to engage fairly closely within the bore of the ferrule and has the function of conveying laterally directed stresses on the spur to the ferrule so that they are absorbed by a greater part of the wood, that is, by the wood surrounding both the shank and the ferrule.

In certain instances the ferrule may not be necessary, but it is preferred since it permits a greater compression of the wood or of greater initial differences in diameters of the entering parts of the shank as compared to the hole drilled in the shuttle material thereby to obtain just as much holding power as is possible without any tendency toward splitting the wood either upon driving the spur into position, or introducing strains therein which may cause later splitting once the shuttle has been subjected to the repeated shock forces attendant upon its use in a loom.

One embodiment and a modification in which the invention may take are hereinafter described by way of example and a more specific and detailed description follows hereinafter wherein reference is made to the accompanying figures of drawing in which.

Now referring to the figures, a shuttle body 10 which is preferably made of any of those woods employed for loom shuttles, is tapered toward the end and is drilled at 11 to form a hole for reception of a spur shank and is further recessed to provide an annular space 12 concentric to the hole 11 and within which the ferrule is eventually to be seated. Only one end of the shuttle is herein illustrated, but it is to be understood that both ends are similarly formed and each has a similar spur and ferrule seated therein.

Figure 3:
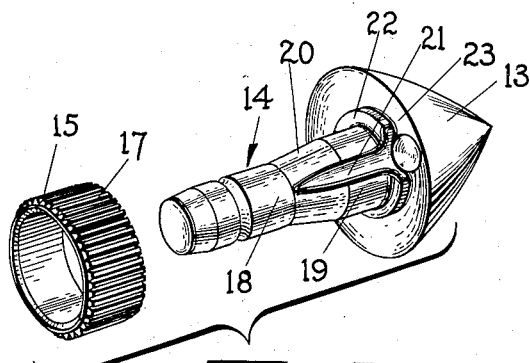
Fig. 3 is an exploded view showing a preferred form of shuttle spur and a cooperating ferrule.

Now referring to Fig. 3, the shuttle spur comprises a tip portion 13 which is of conoidal form and which blends smoothly into the curvature of the tapering end of the shuttle body, and a shank 14 of general cylindrical form throughout its entire length and of a diameter such that when forced into the hole 11 under considerable pressure it will be retained therein due to the frictional contact therewith, it being understood that the difference in the diameter of the shank and of the hole is generally kept at such a value as to provide the greatest retaining force without running any appreciable danger of splitting the shuttle material when the shank is forced into place. As is the common practice the hole 11 is coated with a suitable adhesive which adds to the force with which the shank is retained once it has been seated therein and the adhesive has set.

The ferrule 15 is essentially a retaining ring of inner diameter somewhat greater than the largest outside diameter of the shank 14 of the spur so as to provide for a column of wood 16 between the two such that it may, upon compression, contribute greatly to the holding force, but of sufficient volume such that it will not easily be destroyed or weakened. This ferrule may be of generally smooth exterior, but either or both the inside or outside thereof may be serrated or otherwise roughened as illustrated at 17 thereby to hold it more tightly within the annular space into which it is driven. These serrations are preferably relatively small in size and extend lengthwise of the piece so that upon insertion they compress the wood to form indentations therein without cutting or destroying the cell structure of the wood.

Now returning to the spur shank 14, it is divided into three general sections, one indicated by numeral 18 being of minimum diameter, although of such diameter as to be forced rather tightly into the hole 11. That portion thereof indicated at 19 and which lies more closely adjacent the tip 13 and of an extent substantially equal to the length of the ferrule, is of increased diameter and is connected to the smaller section 18 by a tapering portion 20, the taper of which may vary within reasonable limits, but which is maintained more or less in accordance with what is herein illustrated so that the shank may enter and compress the wood of the shuttle with a minimum of resistance.

At one or more points spaced about the periphery of the sections 19 and 20, preferably at points 180° apart, grooves 21 are formed, preferably by drilling or milling or by any other satisfactory machine method. These grooves are of semi-circular form and indent the material of the shank to such an extent that an appreciable portion of the distorted wood surrounding that shank may enter the groove or grooves and will constitute enough of the surrounding material to provide an effective rotation resisting key. The corners of the groove are preferably somewhat rounded or smoothed so as to prevent cutting of the wood and the actual deformation of material must be kept within limits such that the action is one of molding or reforming of the wood without destroying its cell continuity as might well occur by shearing in the event the grooves were too large or were provided with excessively sharp or roughened corners or in other ways so formed as to have a destructive effect rather than the desired molding effect above mentioned.

Figure 1:
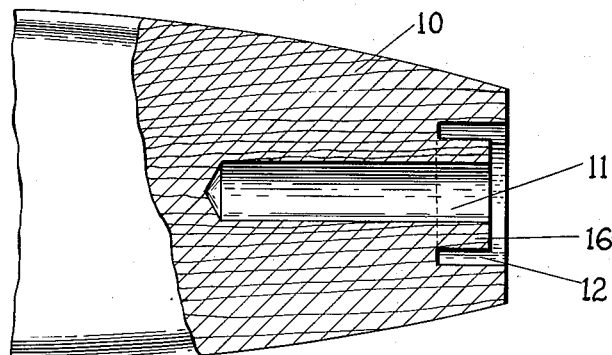
Fig. 1 is a section adjacent the end of a shuttle showing the wood as it is formed for the reception of the shuttle spur and ferrule.
Figure 2:
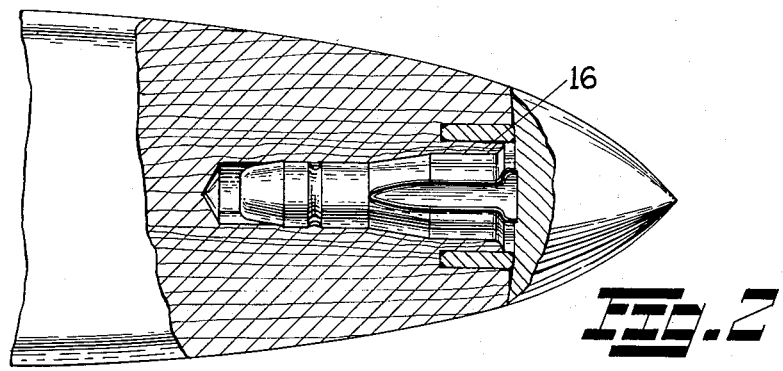
Fig. 2 is a corresponding section but showing the ferrule and spur in position.

In Fig. 2 the ferrule and spur are illustrated having been driven into place as they are under considerable pressure directed against the spur tip while the shuttle body is held in alignment with the shank, and the wood just surrounding the portion 18 of the shank can be seen to have deformed to an extent, while the column of wood 16 may be observed as having been distorted considerably more. The rotational forces set up upon rapid picking of the shuttle to and fro are thus effectively resisted by the action of the complementary key molded from the surrounding wood and the keyways or grooves or indentations 21 which are formed as a part of the spur shanks.

In order to take the transverse forces applied to the spur tips and to distribute those forces so that they are resisted by the surrounding wood of both the spur and the ferrule, a shoulder 22 is formed between the enlarged section 19 and the inner face 23 of the spur tip, this shoulder being of a diameter such as to fit fairly tightly in the interior bore of the ferrule. The parts are chamfered or rounded in such a manner that the shoulder must be forced into its proper position to enter the ferrule and in order to provide for the spur being seated fully so that the face 23 bears against the cooperating face on the shuttle body, the column of wood 16 is cut somewhat shorter than it otherwise would be.

While it is not necessary from the point of view of holding the spur against turning, the grooves 21 are continued clear through into the shoulder 22 the space or opening thus left in the shoulder material providing for the escape or outward flow of excess adhesive since there is always some adhesive which is forced outwardly from the hole 11 as the spurs are driven into place.

Figure 6:
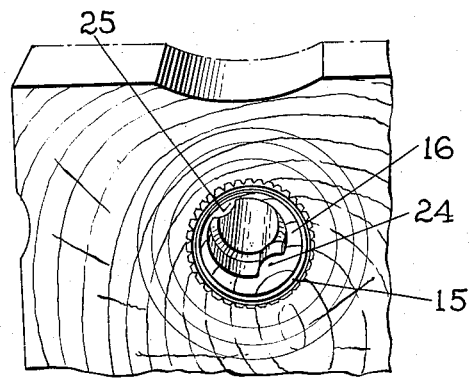
Fig. 6 is a perspective view of one end of a shuttle blank showing the wood thereof as it appears after withdrawal of a spur.

Now referring to Fig. 6, a perspective view of the end of a shuttle blank from which a spur has been withdrawn after having been seated therein as illustrated in Fig. 2 shows the distorted or molded wood within the ferrule 15, this column 16 having at opposed points inwardly directed keyed portions 24 and 25 which are the result of the molding effect of the enlarged section 19 and the grooves 21 formed therein. These complementary keys 24 and 25 actually remain in the wood after withdrawal of a spur showing that they are formed wholly due to the effect of the compression of the material and, obviously, they serve their intended purpose in that, in combination with the complementary indentations in the shank of the spur, they must prevent any rotational movement between the spur and the shuttle body.

Figure 4:
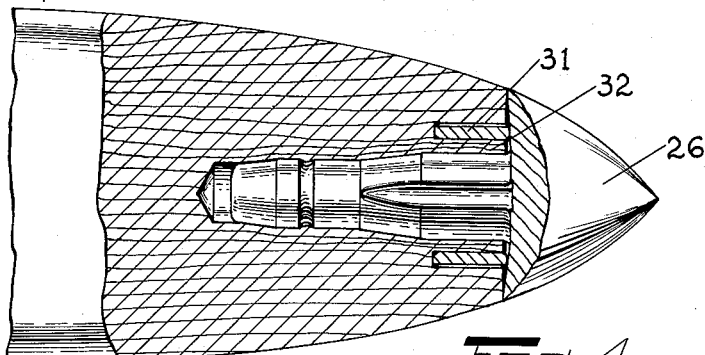
Fig. 4 is a section corresponding to Fig. 2, but showing a modification.
Figure 5:
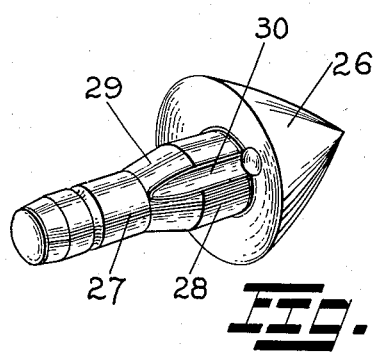
Fig. 5 is a perspective view of the spur according to the modification of Fig. 4.

Now referring to Figs. 4 and 5, a simplified modification of the invention involves a spur having a tip 26, a shank of generally circular cross section one portion 27 thereof being of smaller diameter and the other portion 28 of slightly larger diameter, these being interconnected by the tapered intermediate or transitional part 29. One or more grooves or indentations 30 serve the same purpose as the grooves 21 and this shank is not provided with any shouldered portion or collar such as that at 22, Fig. 3, so that lateral forces are not carried through to the ferrule 31 by anything other than the column of wood 32 interposed between the shank and ferrule. The construction herein illustrated in these figures is simpler and in some instances may be employed thereby dispensing with the additional refinement of the shoulder or collar 22 which, in effect, provides a positive, metallic, stress conducting member between the spur and ferrule.

While the length of the enlarged section 28 is stated to be substantially equivalent to that of the length of the ferrule, there is considerable latitude as to the length of the respective surfaces and the ferrule itself may be longer or shorter in proportion as compared to that herein illustrated; likewise, the parts of the shank which are of different diameters may be varied within reasonable limits.

While one embodiment and a modification of the invention have been disclosed, it is to be understood that the inventive concept may be carried out in a number of ways. This application is, therefore, not to be limited to the precise details described, but is intended to cover all variations and modifications falling within the spirit of the invention and the scope of the claims.

I claim:

1. In a loom shuttle the combination of a shuttle body, a ferrule and a spur having a tip and a shank, means forming a part of said shuttle body and defining an elongated hole and an annular recess for receiving the spur shank and the ferrule respectively, said spur shank being of general cylindrical section throughout its length, one portion thereof adjacent the spur tip and of length substantially coextensive with the length of the ferrule being of a diameter greater than that of a portion adjacent the shank end, and a tapered section between the two, and means for preventing the spur from rotating relatively to the shuttle body in which it is inserted which comprises one or more rounded, longitudinal grooves in both the said shank portion of larger diameter and in the tapered portion thereof, said grooves being of a depth to receive a part of the shuttle body material which is compressed between the ferrule and shank upon assembly and to mold that material into a complementary key.

2. In a loom shuttle the combination of a shuttle body, a ferrule, and a spur having a tip and a shank, means forming a part of said shuttle body and defining an elongated hole and an annular recess for receiving the spur shank and ferrule, respectively, said spur having an enlarged shank section adjacent the tip forming a shoulder the outside diameter of which is of a dimension to fit inside the ferrule without substantial clearance, thereby to transfer lateral stresses imparted to the spur to the material of the shuttle through both the shank and the ferrule.

3. A loom shuttle spur comprising a tip and a shank, said shank being of general cylindrical section throughout its length and having one portion of a minimum diameter and extending for over one half the shank length, a second portion of larger diameter adjacent the spur and a tapered portion interconnecting the two said portions, an enlarged shoulder of short extent adjacent the tip and a plurality of grooves in said portion of larger diameter and extending into both the tapered portion and the enlarged shoulder.

4. A loom shuttle spur comprising a tip and a shank, said shank being of general cylindrical section for at least a part of its length and comprising an end of relatively small diameter, a part of larger cross section between said smaller end section and the tip, said part being formed of contour such as to resist a tendency of the spur to turn on its axis when driven into the material of a shuttle, a tapered portion interconnecting the parts of cylindrical and of larger cross section, and an enlarged shoulder of short extent adjacent the tip.

5. In a loom shuttle the combination of a shuttle body, a ferrule, and a spur having a tip and a shank, means forming a part of said shuttle body and defining an elongated hole and an annular recess for receiving the spur shank and ferrule, respectively, said spur having its shank formed of two different cross sectional conformations, that at the end opposite the tip being of smaller section while that adjacent the tip is of enlarged section and of a non-circular conformation to prevent rotation of the spur in the shuttle body, and an enlarged shoulder of short extent adjacent the tip and of an outside diameter such as to fit within said ferrule without substantial clearance, thereby to transfer lateral stresses imparted to the spur to the material of the shuttle through both the shank and the ferrule.

6. A loom shuttle spur comprising a tip and a shank, said shank being of general cylindrical section throughout its length, a portion thereof adjacent the spur tip being of a diameter greater than that of a portion adjacent the shank end, a tapered section between the two, and means for preventing the spur from rotating relatively to a shuttle body in which it is inserted which comprises one or more longitudinal grooves in both the said shank portion of larger diameter and in the tapered portion thereof, said grooves being of a depth to receive a part of the shuttle body material and to compress and mold that material into a complementary key when the spur is inserted in a shuttle.

7. In a loom shuttle of the character described, a tip member having a nose portion, and a shank positioned entirely in a hole in the end of the shuttle body, said shank having an enlarged cylindrical portion of substantially circular cross-section adjacent the base of the nose portion of the tip member, a ring member mounted in the end of the shuttle body concentric with the enlarged portion of the shank of the tip member, and a portion of the shuttle body disposed between the enlarged portion of the shank and the inner surface of the ring member, said portion of the shuttle body being highly compressed when the tip member is in position, and the enlarged portion of the shank of the tip member being in direct engagement with said highly compressed portion of the shuttle body.

References Cited in the file of this patent

UNITED STATES PATENTS

| Number | Name | Date |
|---|---|---|
| 35,602 | Frink | June 17, 1862 |
| 1,516,671 | D'Arcy | Nov. 25, 1924 |
| 2,501,624 | Tifft | Mar. 21, 1950 |
| 2,545,427 | Kaufmann | Mar. 13, 1951 |
| 2,548,052 | Phaneuf et al. | Apr. 10, 1951 |

FOREIGN PATENTS

| Number | Country | Date |
|---|---|---|
| 12,352 | Great Britain | of 1897 |